United States Patent
Long et al.

(10) Patent No.: US 9,933,017 B2
(45) Date of Patent: Apr. 3, 2018

(54) BEARING SUPPORTS

(71) Applicant: United Technologies Corporation, Farmington, CT (US)

(72) Inventors: Wesley Paul Long, Vernon, CT (US); Grace E. Szymanski, Burlington, CT (US); Julie Marquis, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/106,621

(22) PCT Filed: Dec. 5, 2014

(86) PCT No.: PCT/US2014/068765
§ 371 (c)(1),
(2) Date: Jun. 20, 2016

(87) PCT Pub. No.: WO2015/130370
PCT Pub. Date: Sep. 3, 2015

(65) Prior Publication Data
US 2016/0327098 A1 Nov. 10, 2016

Related U.S. Application Data

(60) Provisional application No. 61/918,891, filed on Dec. 20, 2013.

(51) Int. Cl.
*F16C 33/58* (2006.01)
*F01D 25/16* (2006.01)
(Continued)

(52) U.S. Cl.
CPC .......... *F16C 35/077* (2013.01); *F01D 25/164* (2013.01); *F16C 19/06* (2013.01);
(Continued)

(58) Field of Classification Search
CPC ........ F16C 19/06; F16C 27/04; F16C 33/581; F16C 35/077; F16C 19/26; F16C 33/467;
(Continued)

(56) References Cited

U.S. PATENT DOCUMENTS 4,084,861 A * 4/1978 Greenberg ............ F01D 25/164
384/105
4,337,982 A * 7/1982 Moringiello .......... F01D 25/164
384/581
(Continued)

FOREIGN PATENT DOCUMENTS

DE 102011007101 A1 * 10/2012 ............ F16C 33/467
EP 1413631 A2 * 4/2004 ............... C21D 1/78

OTHER PUBLICATIONS

International Search Report for International Application No. PCT/US2014/068765, dated Sep. 9, 2015.
(Continued)

*Primary Examiner* — Marcus Charles
(74) *Attorney, Agent, or Firm* — Cantor Colburn LLP

(57) ABSTRACT

A bearing support includes a squirrel cage including a fenestrated portion with a plurality of circumferentially spaced apart windows defined therethrough. A bearing support cage inboard of the squirrel cage defines a plurality of circumferentially spaced apart windows therethrough. The bearing support cage is operatively connected to the squirrel cage to support a bearing from within the squirrel cage.

17 Claims, 4 Drawing Sheets

(51) Int. Cl.
*F16C 19/06* (2006.01)
*F16C 27/04* (2006.01)
*F16C 35/07* (2006.01)
*F16C 35/077* (2006.01)

(52) U.S. Cl.
CPC ............ *F16C 27/04* (2013.01); *F16C 33/581* (2013.01); *F05D 2220/32* (2013.01); *F05D 2230/642* (2013.01); *F16C 2204/60* (2013.01); *F16C 2360/23* (2013.01)

(58) Field of Classification Search
CPC .............. F16C 33/4641; F16C 33/4623; F16C 2360/23; F16C 2204/42; F16C 2204/60; F16C 25/162; F16C 25/243; F05D 2230/642; F01D 25/162; F01D 25/243
USPC ....... 384/535, 559–560, 572, 579, 585, 564; 415/229; 416/223 A, 224 A
See application file for complete search history.

(56) References Cited

U.S. PATENT DOCUMENTS

| | | | | |
|---|---|---|---|---|
| 4,451,110 A | * | 5/1984 | Forestier | F01D 25/164 384/582 |
| 4,971,457 A | * | 11/1990 | Carlson | F01D 25/164 384/581 |
| 5,088,840 A | * | 2/1992 | Radtke | F01D 25/164 384/535 |
| 6,443,698 B1 | * | 9/2002 | Corattiyil | F01D 25/16 384/581 |
| 7,384,199 B2 | * | 6/2008 | Allmon | F01D 25/164 384/581 |
| 7,857,519 B2 | | 12/2010 | Kostka et al. | |
| 8,182,156 B2 | * | 5/2012 | Kinnaird | F01D 25/164 384/535 |
| 8,342,796 B2 | * | 1/2013 | Spencer | F01D 25/164 384/99 |
| 8,573,922 B2 | * | 11/2013 | Milfs | F01D 21/045 384/624 |
| 8,747,054 B2 | * | 6/2014 | Witlicki | F01D 25/164 415/119 |
| 2007/0031078 A1 | | 2/2007 | Hackett | |
| 2009/0304318 A1 | * | 12/2009 | Konno | F16C 19/52 384/492 |
| 2010/0027930 A1 | | 2/2010 | Kinnaird et al. | |
| 2012/0189429 A1 | | 7/2012 | Witlicki | |

OTHER PUBLICATIONS

Written Opinion for International Application No. PCT/US2014/068765, dated Sep. 9, 2015.

* cited by examiner

BEARING SUPPORTS

RELATED APPLICATIONS

The application is a National Phase Application of Patent Application PCT/US2014/068765 filed on Dec. 5, 2014, which claims the benefit of and priority to U.S. Provisional Patent Application No. 61/918,891, filed Dec. 20, 2013, the contents each of which are incorporated herein by reference in their entirety.

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND OF THE INVENTION

1. Field of the Invention

The present disclosure relates to bearing supports, and more particularly to bearing supports for use in gas turbine engines, for example.

2. Description of Related Art

A variety of systems can be used to provide support for bearings. For example, in gas turbine engines bearings for rotor shafts can be supported from a squirrel cage structure. The squirrel cage typically includes a flexible member, typically in the form of a cylindrical cage with windows defined therethrough. The flexibility of the squirrel cage can accommodate vibrations, such as when a rotor shaft temporarily goes out of round due to uneven thermal expansion, or when accelerating through key resonance frequencies.

Such conventional methods and systems have generally been considered satisfactory for their intended purpose. However, there is still a need in the art for improved devices and techniques for supporting bearings. The present disclosure provides a solution for this need.

SUMMARY OF THE INVENTION

A bearing support includes a squirrel cage including a fenestrated portion with a plurality of circumferentially spaced apart beams defined therein. A bearing support cage inboard of the squirrel cage defines a plurality of circumferentially spaced apart beams therein. The bearing support cage is operatively connected to the squirrel cage to support a bearing from within the squirrel cage.

In accordance with certain embodiments, the squirrel cage and bearing support cage are integral with one another. The bearing support cage can include a bearing outer race configured to engage a bearing directly. The bearing outer race can be a separate component joined to the bearing support cage. The bearing outer race can include M50NiL, and the squirrel cage and bearing support cage can each include titanium. Each of the bearing support cage and the bearing outer race can include a respective fastener flange extending therefrom, wherein the respective fastener flanges are joined together with fasteners. It is also contemplated that the bearing outer race and bearing support cage can be integral with one another. For example, the squirrel cage, bearing support cage, and outer bearing race can all be a single integral component made of M50NiL.

It is also contemplated that the bearing support cage can be a separate component joined to the squirrel cage. For example, there can be a weld joint, bolts, or the like, joining the squirrel cage to the bearing support cage. The bearing support cage can include M50NiL, and the squirrel cage can include titanium.

In another aspect, each circumferentially adjacent pair of the beams of the squirrel cage are separated by a squirrel cage window, and each circumferentially adjacent pair of the beams of the bearing support cage are separated by a support cage window. Each of the squirrel cage beams can optionally be radially aligned with a respective one of the support cage beams. The squirrel cage beams can extended in an axial direction with respect to a longitudinal axis defined by the bearing support cage. The support cage beams can extend in the axial direction, or obliquely with respect to the longitudinal axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
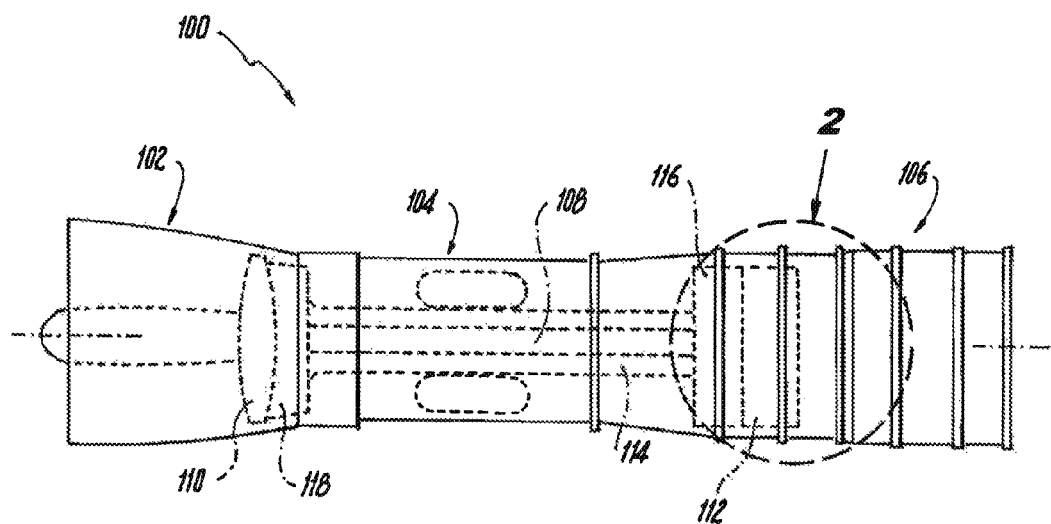
FIG. 1 is a schematic side elevation view of an exemplary embodiment of a gas turbine engine constructed in accordance with the present disclosure.

Reference will now be made to the drawings wherein like reference numerals identify similar structural features or aspects of the subject disclosure. For purposes of explanation and illustration, and not limitation, a partial view of an exemplary embodiment of a gas turbine engine in accordance with the disclosure is shown in FIG. 1 and is designated generally by reference character 100. Other embodiments of gas turbine engines in accordance with the disclosure, or aspects thereof, are provided in FIGS. 2-8, as will be described. The systems and methods described herein can be used for supporting bearings, for example in gas turbine engines.

Gas turbine engine 100 includes a compressor 102 for compressing air, a combustor 104 for heating the air by combustion, and a turbine 106 for extracting work from the combustion products. Shaft 108 connects a low pressure compressor rotor 110 to a low pressure turbine rotor 112 for common rotation, and shaft 114, mounted concentric with shaft 108, connects a high pressure turbine rotor 116 to a high pressure compressor rotor 118 for common rotation. Other aspects of engine 100 not discussed herein will be readily appreciated by those skilled in the art.

Figure 2:
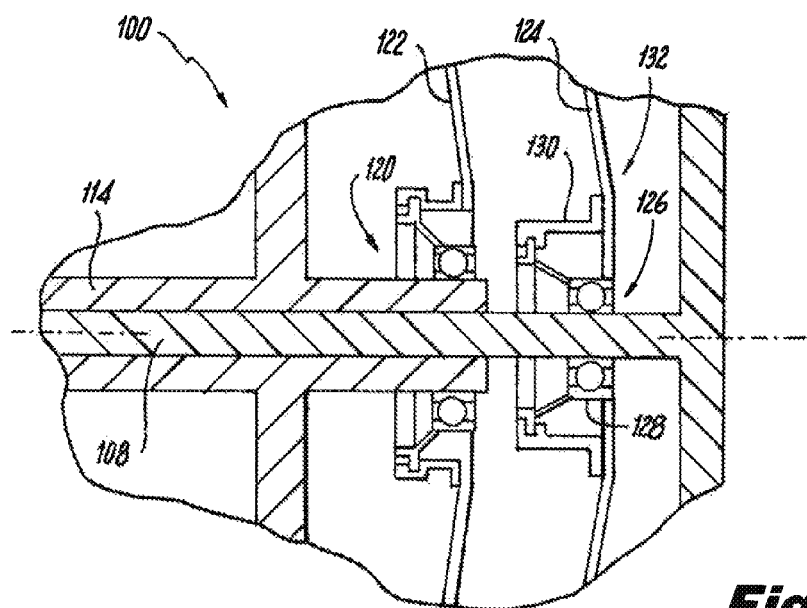
FIG. 2 is a schematic cross-sectional side elevation view of a portion of the gas turbine engine of FIG. 1, showing aft bearings and bearing supports for high and low pressure rotary shafts.

Referring now to FIG. 2, shaft 114 is supported by a first bearing 120, and shaft 108 is supported by a second bearing 126. Bearings 120 and 126 are in turn supported by respective housings 122 and 124. Bearing 126 is described in greater detail, and those skilled in the art will readily appreciate that bearing 120 can be configured in the same or a different manner. Bearing 126 is directly supported by a bearing outer race 128, which connects to a squirrel cage 130, which in turn connects to housing 124.

Figure 3:
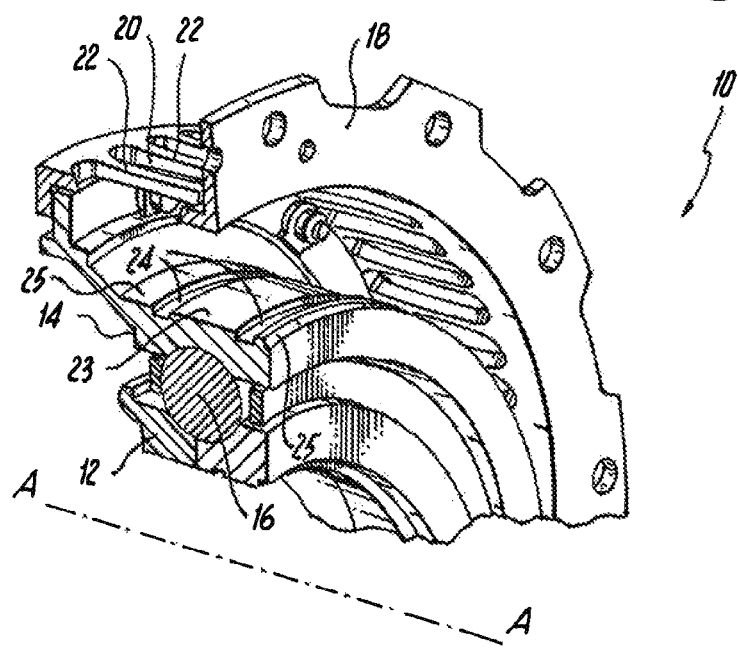
FIG. 3 is a cross-sectional perspective view of a bearing support showing the squirrel cage.

With reference now to FIG. 3, an exemplary bearing support 10 is shown having an inner race 12, and an opposed outer race 14 in direct contact with bearings 16. Squirrel cage 18 connects between outer race 14 and a housing, e.g., housing 124 shown in FIG. 2. Squirrel cage 18 defines a plurality of beams 22 defined therein, not all of which are labeled in FIG. 3 for sake of clarity. In between each circumferentially adjacent pair of beams 22 is a squirrel cage windows 20. Beams 22 lend flexibility to squirrel cage 18, to provide resilience against vibration of bearing 16. The dimensions and number of squirrel cage beams 22 can vary as suitable for specific applications. However, there can be limitations on how far the dimensions and number of squirrel cage beams 22 can vary. For example, in order to accommodate a requirement for larger squirrel cage deflections, it may be necessary to lengthen all of the squirrel cage beams 22, which could result in an increase in size and weight. In certain applications the increase in size and/or weight may not be desirable.

One drive for needing greater squirrel cage deflections is a requirement for larger damper strokes. A damper surface 23 is defined in outer race 14 between piston ring grooves 24, which define circumferential channels around outer race 14. The damper gap between the damper surface 24 of outer race 14 and a radially opposed damper surface in the housing to which squirrel cage 18 is mounted (not shown in FIG. 3, but see, e.g., housing 124 in FIG. 2) is limited by a stop gap, e.g., radially between ridges 25 and housing 124, since ridges 25 stand proud of the damper surface 23. The stop gap is the maximum deflection of a rotor before bottoming out the damper. Generally, the larger the stop gap, the larger is the stress imposed on the squirrel cage 18. One way to accommodate a larger stop gap requirement is to increase the length of the squirrel cage beams as described above.

Figure 4:
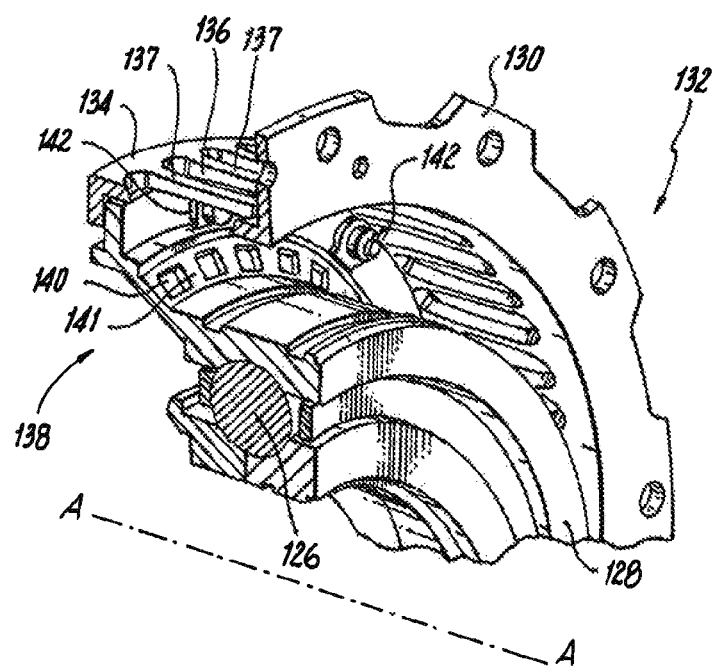
FIG. 4 is a cross-sectional perspective view of an exemplary embodiment of a bearing support, showing windows in both the squirrel cage and in the bearing support cage.

Referring now to FIG. 4, a bearing support 132 is described, which provides additional design parameters and may thereby relieve the need to lengthen the squirrel cage beams, for example. Bearing support 132 includes squirrel cage 130 of FIG. 2, with a cylindrical fenestrated portion 134 with a plurality of circumferentially spaced apart windows 136 defined therethrough. Not all of windows 136 are identified in FIG. 4 for sake of clarity. A bearing support cage 138 is provided inboard squirrel cage 130. Bearing support cage 138 defines a plurality of circumferentially spaced apart windows 140 through a fenestrated portion thereof. Not all of windows 140 are identified in FIG. 4 for sake of clarity.

Bearing support cage 138 is operatively connected to squirrel cage 130 to support bearing 126 from within squirrel cage 130. Bearing support cage 138 includes bearing outer race 128, which is configured to engage bearing 126 directly. Bearing outer race 128 is integral with bearing support cage 138, and squirrel cage 130 is a separate component joined to bearing support cage 138, e.g., with bolts 142. Bearing outer race 128 and bearing support cage 138 can be made from any suitable material, for example a bearing steel such as M50, a well-known steel used for bearing applications in aircraft engine steels or M50NiL its low carbon, high nickel variation, and squirrel cage 130 can be made from any suitable material including titanium, for example.

Each circumferentially adjacent pair of the windows 136 of squirrel cage 130 are separated by a respective squirrel cage beam 137, not all of which are identified in FIG. 4. Each circumferentially adjacent pair of the windows 140 of the bearing support cage 138 are separated by a respective support cage beam 141. The squirrel cage beams 137 extended in an axial direction with respect to a longitudinal axis A defined by bearing support cage 138. The support cage beams 141 extend obliquely with respect to the longitudinal axis A, i.e., the fenestrated portion of bearing support cage 138 is conical.

Figure 5:
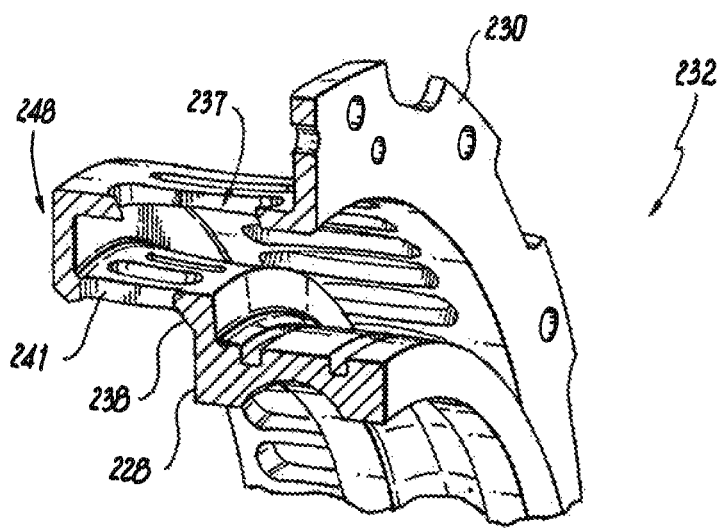
FIG. 5 is a cross-sectional perspective view of another exemplary embodiment of a bearing support, showing a squirrel cage, bearing support cage, and outer bearing race all as a single integral component.
Figure 6:
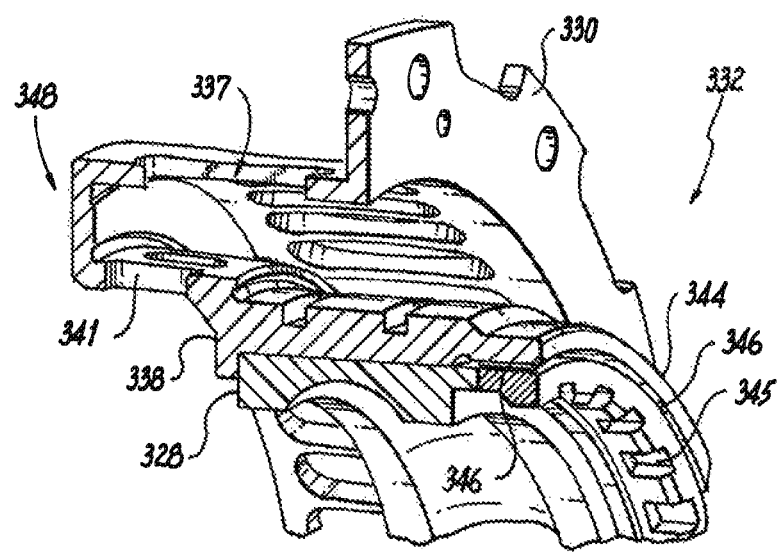
FIG. 6 is a cross-sectional perspective view of another exemplary embodiment of a bearing support, showing a squirrel cage integral with a bearing support cage, with a separate bearing outer race joined to the bearing support cage.
Figure 7:
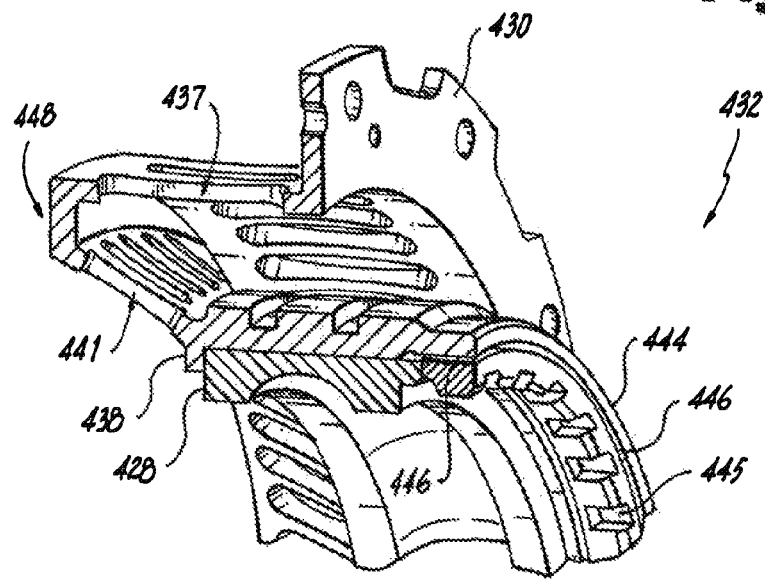
FIG. 7 is a cross-sectional perspective view of another exemplary embodiment of a bearing support, showing a squirrel cage integral with a bearing support cage, wherein the support cage beams are oblique with respect to the longitudinal axis.

With reference now to FIGS. 5-7, three embodiments of bearing supports are described, and in each the squirrel cage and bearing support cage are integral with one another. Bearing support 232 in FIG. 5 includes a bearing outer race 228 integral with a bearing support cage 238, which is in turn integral with squirrel cage 230. All of the components of bearing support 232 can be made from a single work piece of any suitable material, e.g., M50NiL. As shown in FIG. 6, in bearing support 332, the bearing outer race 328 is a separate component, e.g., made of M50NiL or any other suitable material, joined to the bearing support cage 338. Bearing support cage 338 is integral with squirrel cage 330, and these latter two components can be made of titanium, or any other suitable material. In each of the bearing supports 232 and 332 of FIGS. 5 and 6, respectively, the squirrel cage beams 237 and 337 extend axially as described above with respect to squirrel cage beams 137 in FIG. 4, and the support cage beams 241 and 341 also extend in the axial direction rather than obliquely as do the obliquely oriented support cage beams 141 in FIG. 4.

Design considerations for choosing between axial beams and oblique beams as described above include, for example, the aspect that when beams are loaded in the axial direction, axial beams are primarily subject to compression and tension, whereas oblique beams are subject to bending, in addition to compression and tension, potentially driving higher stresses. Potential advantages to using axial versus oblique support cage beams depend on system requirements. If the goal is to create more flexible beams to allow for greater deflection in response to higher stop gap requirements, it can be more advantageous to use axial beams. In cases where greater housing stiffness is needed for system requirements, it can be more advantageous to use oblique support cage beams.

Bearing support 432 of FIG. 7 includes a squirrel cage 430 integral with a bearing support cage 438, with a separate bearing outer race 428 joined to bearing support cage 438, as described above with respect to bearing support 332 in FIG. 6. The squirrel cage beams 437 extend axially, whereas the support cage beams 441 extend obliquely much as described above with respect to FIG. 4.

Bearing support cage 438 includes a respective fastener flange 444 extending therefrom. A nut 445 including threads 446 is threaded into corresponding threads in flange 444, and threads 446 wrap circumferentially around the respective circumference of bearing support cage 438 and bearing outer race 428. It is also contemplated that radial bolts, pins, thread lock agent, and/or other suitable anti-rotation measures can be applied to flanges 444 and nut 445 to prevent unthreading. As shown in FIG. 6, bearing support 332 includes a similar fastener flange 344, nut 345, and threads 346.

Referring to each of FIGS. 5-7, while the respective squirrel cages 230, 330, and 430 have been described above as being integral with the respective bearing support cages 238, 338, and 438, it is also contemplated that the respective bearing support cages 238, 338, and 438 can each be a separate component joined to the respective squirrel cage 230, 330, and 430. For example, there can optionally be a weld joint joining the respective squirrel cage 230, 330, and 430 to the respective bearing support cage 238, 338, and 438. It is also contemplated that the respective squirrel cage 230, 330, and 430 can be bolted to the respective bearing support cage 238, 338, and 438, as shown in FIGS. 3-4, for example. Optional weld joint or bolt locations 248, 348, and 448 are shown in FIGS. 5-7, respectively. Those skilled in the art will readily appreciate that any other suitable weld or bolt location can be used without departing from the scope of this disclosure.

Figure 8:
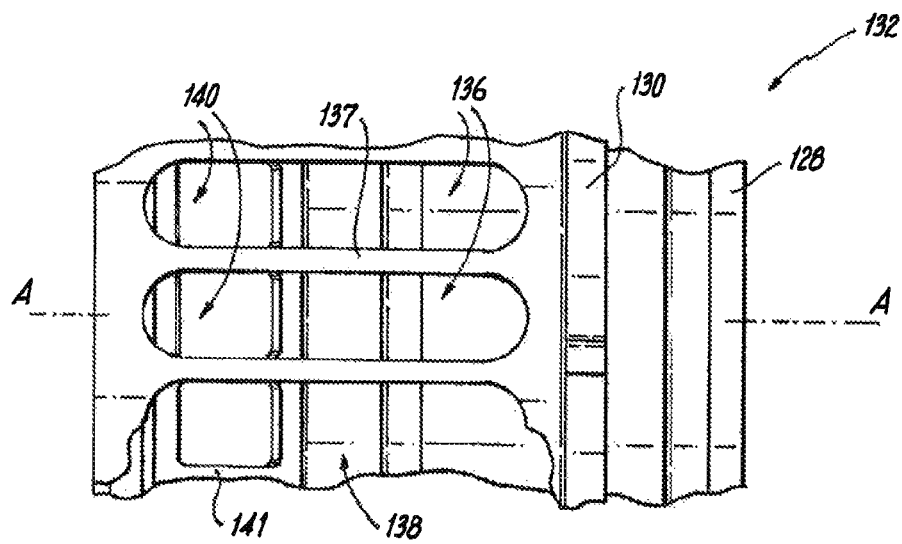
FIG. 8 is a schematic side elevation view of the bearing support of FIG. 4, showing the radial alignment of the windows defined through the squirrel cage and the bearing support cage.

With reference now to FIG. 8, the view is schematic, wherein the circumference of bearing support cage 138 and squirrel cage 130 are mapped out as though flat. Each of the squirrel cage beams 137 (also shown in FIG. 4) is radially aligned with a respective one of the support cage beams 141, which are not visible in FIG. 8 due to being beneath squirrel cage beams 137, but see FIG. 4. In other words, each window 136 in squirrel cage 130 is radially aligned with a respective window 140 in bearing support cage 138. This radial alignment is optional, but can be used in any of the embodiments described herein, for example, to facilitate machining windows 136 and 140.

M50NiL and titanium are described above as exemplary materials. Those skilled in the art will readily appreciate that any other suitable materials can be used without departing from the scope of this disclosure. For example, M50 can be substituted for M50NiL in the examples above.

Those skilled in the art will readily appreciate that traditionally, the length, inner diameter, and thicknesses of squirrel cage beams were the only design variables available to tune a bearing's stiffness to a desired level. The systems and methods described herein provide additional design variables in the form of the length, inner diameter, and thicknesses of bearing support cage beams. This can provide design flexibility to meet higher requirements for stop gap, and/or stricter envelope requirements, for example.

The methods and systems of the present disclosure, as described above and shown in the drawings, provide for bearing supports with superior properties including the potential for improved design flexibility. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bearing support comprising:
   a squirrel cage including a fenestrated portion with a plurality of circumferentially spaced apart beams defined therein; and
   a bearing support cage inboard of the squirrel cage, the bearing support cage defining a plurality of circumferentially spaced apart beams therein, the bearing support cage being operatively connected to the squirrel cage to support a bearing from within the squirrel cage, wherein the bearing support cage extends from the fenestrated portion of the squirrel cage to the bearing.

2. A bearing support as recited in claim 1, wherein the bearing support cage includes a bearing outer race configured to engage the bearing directly.

3. A bearing support as recited in claim 2, wherein the squirrel cage, the bearing support cage, and the bearing outer race are all integral with one another.

4. A bearing support as recited in claim 3, wherein the squirrel cage, the bearing support cage, and outer bearing race are all a single integral component.

5. A bearing support as recited in claim 2, wherein there is a weld joint joining the squirrel cage to the bearing support cage.

6. A bearing support cage as recited in claim 2, wherein there is at least one bolt joining the squirrel cage to the bearing support cage.

7. A bearing support as recited in claim 2, wherein the bearing support cage is a separate component joined to the squirrel cage.

8. A bearing support as recited in claim 7, wherein the bearing support cage includes M50NiL.

9. A bearing support as recited in claim 7, wherein the squirrel cage includes titanium.

10. A bearing support as recited in claim 2, wherein the bearing outer race is a separate component joined to the bearing support cage.

11. A bearing support as recited in claim 10, wherein each of the bearing support cage and the bearing outer race includes a respective fastener flange extending therefrom, wherein the respective fastener flanges are joined together with fasteners.

12. A bearing support as recited in claim 10, wherein the squirrel cage and bearing support cage are integral with one another.

13. A bearing support as recited in claim 10, wherein the bearing outer race includes M50NiL.

14. A bearing support as recited in claim 10, wherein the squirrel cage and bearing support cage each include titanium.

15. A bearing support as recited in claim 1, wherein each circumferentially adjacent pair of the beams of the squirrel cage are separated by a squirrel cage window, wherein each circumferentially adjacent pair of the beams of the bearing support cage are separated by a support cage window, and wherein each of the squirrel cage beams is radially aligned with a respective one of the support cage beams.

16. A bearing support as recited in claim 1, wherein each circumferentially adjacent pair of the beams of the squirrel cage are separated by a squirrel cage window, wherein each circumferentially adjacent pair of the beams of the bearing support cage are separated by a support cage window, and wherein the squirrel cage beams and the support cage beams all extended in an axial direction with respect to a longitudinal axis defined by the bearing support cage.

17. A bearing support as recited in claim 1, wherein each circumferentially adjacent pair of the beams of the squirrel cage are separated by a squirrel cage window, wherein each circumferentially adjacent pair of the beams of the bearing support cage are separated by a support cage window, and wherein the squirrel cage beams all extend in an axial direction with respect to a longitudinal axis defined by the bearing support cage, and wherein the support cage beams extend obliquely with respect to the longitudinal axis.

\* \* \* \* \*